(12) United States Patent
Wang et al.

(10) Patent No.: US 7,330,605 B2
(45) Date of Patent: Feb. 12, 2008

(54) DECODING AND ERROR CORRECTION IN 2-D ARRAYS

(75) Inventors: Jian Wang, Beijing (CN); Zhou Chen Lin, Beijin (CN); Yue Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/470,334

(22) Filed: Sep. 6, 2006

(65) Prior Publication Data

US 2007/0025641 A1    Feb. 1, 2007

Related U.S. Application Data

(62) Division of application No. 10/284,422, filed on Oct. 31, 2002, now Pat. No. 7,116,840.

(51) Int. Cl.
*G06K 9/36* (2006.01)
*G06K 1/00* (2006.01)

(52) U.S. Cl. ..................... 382/291; 345/180

(58) Field of Classification Search ........... 382/224, 382/276, 291, 293, 305, 312; 345/166, 180–183, 345/644
See application file for complete search history.

(56) References Cited

U.S. PATENT DOCUMENTS

| | | | |
|---|---|---|---|
| 4,686,329 A | 8/1987 | Joyce | |
| 4,742,558 A | 5/1988 | Ishibashi et al. | |
| 4,745,269 A | 5/1988 | Van Gils et al. | |
| 5,051,736 A | 9/1991 | Bennett et al. | |
| 5,073,966 A | 12/1991 | Sato | |
| 5,247,137 A | 9/1993 | Epperson | |
| 5,288,986 A | 2/1994 | Pine et al. | |
| 5,294,792 A | 3/1994 | Lewis et al. | |
| 5,365,598 A | 11/1994 | Sklarew | |
| 5,442,147 A | 8/1995 | Burns et al. | |
| 5,448,372 A | 9/1995 | Axman et al. | |
| 5,587,558 A | 12/1996 | Matsushima | |
| 5,612,524 A | 3/1997 | Saint'Anselmo et al. | |
| 5,644,652 A | 7/1997 | Bellegarda et al. | |
| 5,652,412 A | 7/1997 | Lazzouni et al. | |
| 5,661,506 A | 8/1997 | Lazzouni et al. | |
| 5,686,718 A | 11/1997 | Iwai et al. | |
| 5,726,435 A | 3/1998 | Hara et al. | |

(Continued)

FOREIGN PATENT DOCUMENTS

CN        1352778        6/2002

(Continued)

OTHER PUBLICATIONS

CN Office Action dated Jul. 7, 2006, CN Pat Appln. No. 03143455.X.

(Continued)

*Primary Examiner*—Kanjibhai Patel
(74) *Attorney, Agent, or Firm*—Banner & Witcoff, Ltd.

(57) ABSTRACT

A system and process for determining the location of a captured image from a larger image is described. A non-repeating sequence may be folded into a non-repeating array in which the array is unique for every sub window of a given size. The image of the sub window may be captured and its location determined within the non-repeating array.

11 Claims, 10 Drawing Sheets

U.S. PATENT DOCUMENTS

| | | | |
|---|---|---|---|
| 5,817,992 | A | 10/1998 | D'Antonio |
| 5,822,465 | A | 10/1998 | Normile et al. |
| 5,825,015 | A | 10/1998 | Chan |
| 5,852,434 | A | 12/1998 | Sekendur |
| 5,855,483 | A | 1/1999 | Collins et al. |
| 5,898,166 | A | 4/1999 | Fukuda et al. |
| 5,902,968 | A | 5/1999 | Sato et al. |
| 5,937,110 | A | 8/1999 | Petrie et al. |
| 5,960,124 | A | 9/1999 | Taguchi et al. |
| 6,005,973 | A | 12/1999 | Seybold et al. |
| 6,044,165 | A | 3/2000 | Perona et al. |
| 6,052,481 | A | 4/2000 | Grajski et al. |
| 6,076,734 | A | 6/2000 | Dougherty et al. |
| 6,081,261 | A | 6/2000 | Wolff et al. |
| 6,141,014 | A | 10/2000 | Endo et al. |
| 6,226,636 | B1 | 5/2001 | Abdel-Mottaleb et al. |
| 6,243,071 | B1 | 6/2001 | Shwarts et al. |
| 6,249,614 | B1 | 6/2001 | Kolesnik et al. |
| 6,278,968 | B1 | 8/2001 | Franz et al. |
| 6,330,976 | B1 | 12/2001 | Dymetman et al. |
| 6,479,768 | B1 | 11/2002 | How |
| 6,538,187 | B2 * | 3/2003 | Beigi .................... 84/475 |
| 6,546,136 | B1 | 4/2003 | Hull |
| 6,577,299 | B1 | 6/2003 | Schiller et al. |
| 6,585,154 | B1 | 7/2003 | Ostrover et al. |
| 6,592,039 | B1 * | 7/2003 | Smith et al. .......... 235/462.49 |
| 6,650,320 | B1 * | 11/2003 | Zimmerman ............... 345/179 |
| 6,744,967 | B2 | 6/2004 | Kaminski et al. |
| 6,752,317 | B2 | 6/2004 | Dymetman et al. |
| 6,870,966 | B1 | 3/2005 | Silverbrook et al. |
| 7,110,604 | B2 * | 9/2006 | Olsson ...................... 382/224 |
| 2001/0023896 | A1 | 9/2001 | He Duanfeng et al. |
| 2001/0038711 | A1 | 11/2001 | Williams et al. |
| 2002/0000981 | A1 | 1/2002 | Hugosson et al. |
| 2002/0020750 | A1 | 2/2002 | Dymetman et al. |
| 2002/0071488 | A1 | 6/2002 | Kim et al. |
| 2002/0148655 | A1 | 10/2002 | Cho et al. |
| 2002/0163510 | A1 | 11/2002 | Williams et al. |
| 2002/0163511 | A1 | 11/2002 | Sekendur |
| 2003/0063045 | A1 | 4/2003 | Fleming |
| 2003/0063072 | A1 | 4/2003 | Brandenberg et al. |
| 2004/0032393 | A1 | 2/2004 | Brandenberg et al. |

FOREIGN PATENT DOCUMENTS

| | | |
|---|---|---|
| EP | 0407734 | 1/1991 |
| EP | 0439682 | 8/1991 |
| EP | 0564708 A | 10/1993 |
| EP | 0732666 | 9/1996 |
| EP | 0865166 | 9/1998 |
| EP | 1158456 | 11/2001 |
| EP | 0694870 A | 8/2006 |
| WO | 9630217 A | 10/1996 |
| WO | 0025293 | 5/2000 |
| WO | 0073983 | 12/2000 |
| WO | WO 0148685 | 7/2001 |
| WO | WO 0171654 | 9/2001 |
| WO | 02077870 | 10/2002 |

OTHER PUBLICATIONS

EP Search Report dated Jun. 1, 2005, EP Appln. No. 03021238.1-1527.

Kai-Fu Lee, "Automatic Speech Recognition—The Development of the SPHINX System", Kluwer Acedemic Publishers, pp. 1-207, 1992.

Frederick Jelinek, "Statiscal Methods For Speech Recognition", The MIT Press, pp. 1-283, 2001.

Dumer et al., "Hardness of Approximating the Minimum Distance of a Linear Code", IEEE, pp. 475-484, 1999.

Clark et al., "Maximal and Near-Maximal Shift Register Sequences: Efficient Event Counters and Easy Discrete Logarithms", IEEE Transactions on Computers, vol. 43, No. 5, May 1994.

Grasso et al., "Augmenting Recommender Systems by Embedding Interfaces into Practices", pp. 267-275, 1999.

Moran et al., "Design and Technology for Collaborage: Collaborative Collages of Information on Physical Walls", Nov. 1999.

Fujieda et al., "Development Of Pen-Shaped Scanners", Nec, vol. 51, No. 10, 1998.

Crowley et al., "Things That See", Communications of the A.C.M., vol. 43, No. 3, pp. 54-64, Mar. 2000.

Sato et al., "Video Tablet—2D Coordinate Input Device With OCD Camera", Osaka University, vol. J67-D, No. 6, Jun. 1984.

Okada et al., "A High-Resolution Handwriting Character Input Device Using Laser Beams", Department of Instrumentation Engineering, Faculty of Science and Technology, vol. 10.4, No. 11.1, 1981.

Ko et al., "Finger Mouse and Gesture Recognition System As A new Human computer Interface", Computer and Graphics, Col. 21, No. 5, pp. 555-561, 1997.

Champaneria, "PADCAM: A Real-Time, Human-Centric Notetaking System", MIT Laboratory for Computer Science, Mar. 2002.

OTM Technologies, "VPEN—Revolutionizing Human Interaction With The Digital WorldTM", pp. 1-6.

Internet Print Out: "N-Scribe For Digital Writing", Mobileinfo.com, News issue #2001—15 (Apr. 2001), http://www.mobileinfo.com/News_2001/Issue15/Digital-nscribe.htm, dated Jul. 15, 2002.

Internet Print Out: "Don't Break This Ink Pen", Edgereview.com, by Brian Urbanski, http://edgereview.com/ataglance.cfm?category=edge&ID=180, dated Jul. 15, 2002.

Internet Print Out: "Navilite—Optical Opportunities—Bluetooth-enabled optical transition measurement technology paves the way for an untethered stylus than can write on any surface", vol. 8, Issue No. 34, Jul. 5-11, 2002, www.computerworld.com, dated Aug. 15, 2002.

Internet Print Out: "Competitive Technologies' Investee Introduces N-Scribe Pen—Digital Ink Presents Wireless Pen At Demo 2001", Competititive Technologies, http://www.competitivetech, dated Sep. 5, 2003.

Internet Print Out: "DataGlyphs®: Embedding Digital Data", Parc Solutions, http://www.parc.com/solutions/dataglyphs/, dated Jul. 15, 2002.

Internet Print Out: "N-Scribe For Digital Writing", Flash Commerce News, http://flashcommerce.com/articles/, dated Sep. 5, 2003.

Internet Print Out: "The Hot New Medium: Paper—How The Oldest Interface In The Book Is Redrawing The Map Of The Networked World", http://www.wired.com/wired/, dated Sep. 5, 2003.

Internet Print Out: "Maxell Digital Pen To Use Anoto System", Gizmo, http://www.gizmo.com.au/, dated Sep. 5, 2003.

Internet Print Out:"Anoto Pen Bluetooth", Tabletpccorner, http://www.tabletpccorner.net, dated Sep. 5, 2003.

Internet Print Out: "Jot This—Nscribe Pen", PC Magazine, http://www.pcmag.com.article2/0,4149,31650,00.asp, dated Jul. 15, 2002.

Internet Print Out: "Jot This—Nscribe Pen", PC Magazine, http://www.pcmag.com/article2/0,4149,31650,00.asp, dated Sep. 5, 2003.

Internet Print Out: "RF Pen Sends Your Scribbles", Appliance Manufacturing Magazine, http://www.ammagazine.com. Dated Sep. 26, 2002.

Internet Print Out: "Nscribe pen And Presenter-To-Go—Infrared Pen And New Springboard Module Make Their Debut At Demo 2001", Edgereview.com, by Brian Urbanski, http://www.techtv.com/freshgear/pr, dated Sep. 5, 2003.

Internet Print Out: "Don't Break This Ink Pen", Edgereview.com, by Brian Urbanski, http://www.edgereview.com/ataglance.cfm?category=edge&ID=180, dated Sep. 5, 2003.

Internet Print Out: "Preprocessing In the NPen++ System", http://www.is.cs.cmu.edu/mie/multimodal_npen_preproc.html, dated Aug. 8, 2002.

Internet Print Out: "OTM Technologies—V Pen", searched http://www.otmtech.com/vpen3.asp, pp. 1-7.

Internet Print Out: "Mimio—Products", Mimio, http://www.mimio.com, pp. 1-8.

Internet Print Out: "SMART Board Interactive Whiteboard", Smarttech, http://www.smarttech.com, pp. 1-26.

Haynes, "Wacom PL-500", www.wacom.co.uk.

Internet Print Out: "(Electro-Magnetic Resonance) send and position sensing technology" Wacom, Technology, http://www.wacom-components.com/tech.asp, pp. 1-6.

Internet Print Out: "Cordless Batteryless Pen", Wacom Penabled, Components, http://www.wacom.com/components/index.cfm, dated Jul. 15, 2002.

Internet Print Out: "PL-500—15.1 inch Screen Digital LCD Pen Tablet System", Wacom Graphics Tablet Solution, http://ap.wacm.co.jp/products/pl/contents/pl500.html, pp. 1-13.

Internet Print Out: Digital Pens, http://www.anotofunctionality.com/navigate.asp?PageID=96, pp. 1-70.

Dey, et al., "A Fast Algorithm for Computing the Euler Number of an Image and its VLSI Implementation", IEEE: 13th International Conference on VLSI Design (Jan. 2003).

Lau, R., "Adaptive Statisical Language Modeling", Submitted to the Dept. of Electrical Engineering and Computer Science in Partial Fulfillment for the Degree of Master of Science of the MIT, May 1994.

European Office Action dated Mar. 10, 2006 from European Patent Application No. 03021238.5-1527.

OTM Technologies, "VPEN—Revolutionizing Human Interaction With The Digital WorldTM", pp. 1-6, Jul. 15, 2002.

Internet Print Out: "OTM Technologies—V Pen", searched http://www.otmtech.com/vpen3.asp, pp. 1-7, Jul. 15, 2002.

Internet Print Out: "Mimio—Products", Mimio, http://www.mimio.com, pp. 1-8, Sep. 5, 2003.

Internet Print Out: "SMART Board Interactive Whiteboard", Smarttech, http://www.smarttech.com, pp. 1-26, Sep. 5, 2003.

Haynes, "Wacom PL-500", www.wacom.co.uk, Jul. 15, 2002.

Internet Print Out: "(Electro-Magnetic Resonance) send and position sensing technology" Wacom, Technology, http://www.wacom-components.com/tech.asp, pp. 1-6, Jul. 15, 2002.

Internet Print Out: "PL-500—15.1 inch Screen Digital LCD Pen Tablet System", Wacom Graphics Tablet Solution, http://ap.wacm.co.jp/products/pl/contents/pl500.html, pp. 1-13, 2002.

Internet Print Out: Digital Pens, http://www.anotofunctionality.com/navigate.asp?PageID=96, pp. 1-70, Sep. 26, 2002.

* cited by examiner

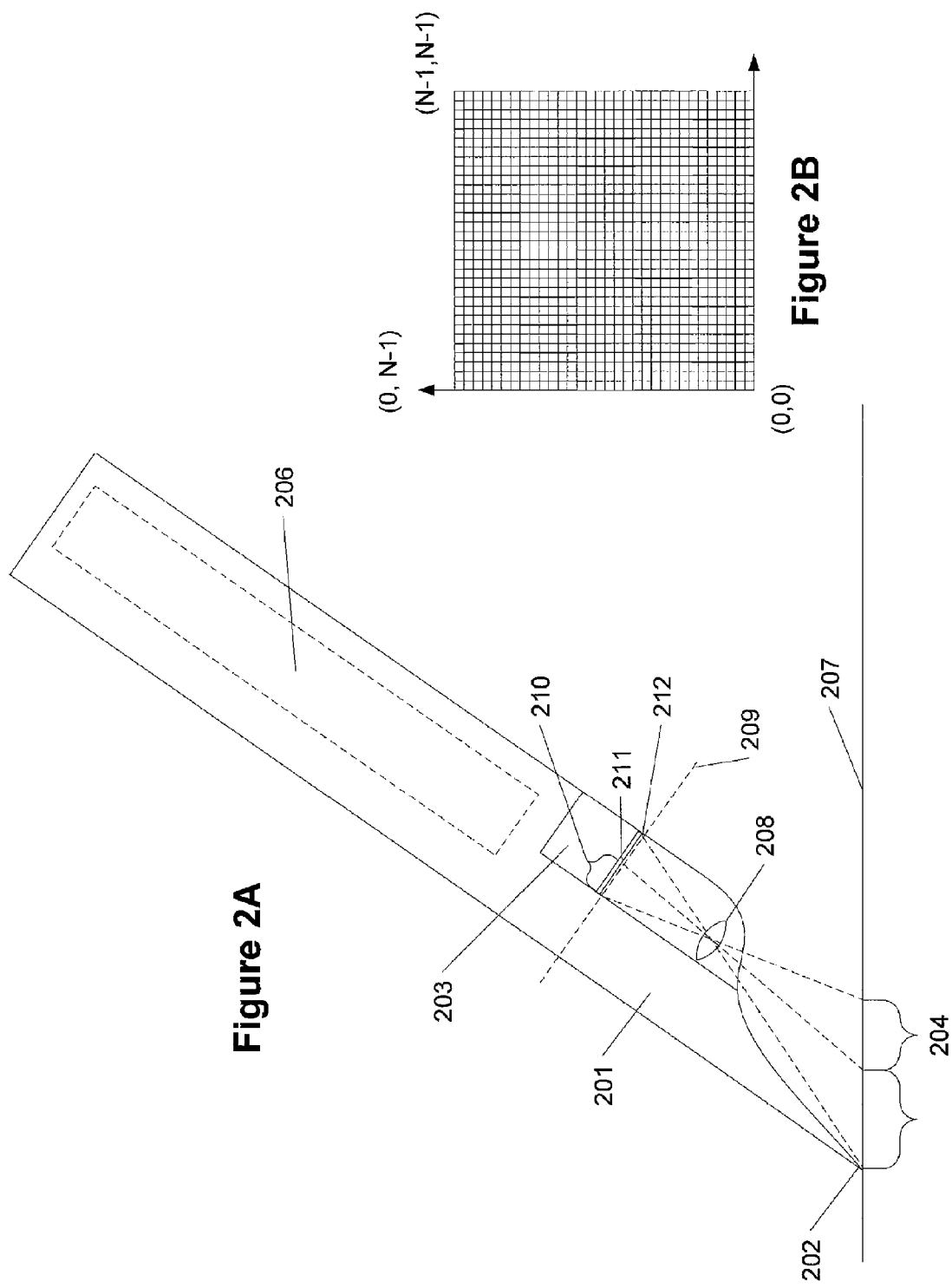

Figure 3A  0111 0000 0101 1101 1001 0111 1111 1000 1010
Figure 3B  0101 01110 110110010 001010011 111101100
Figure 3C  0101 1101 0011 1101 1001 1001 1110 0010
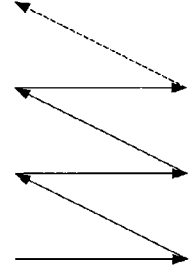
Figure 3D
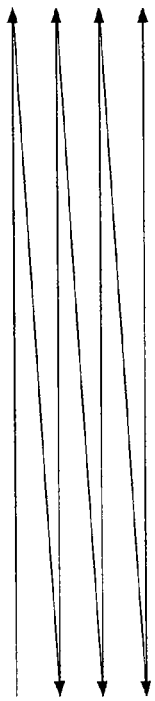
Figure 3E
Figure 3F

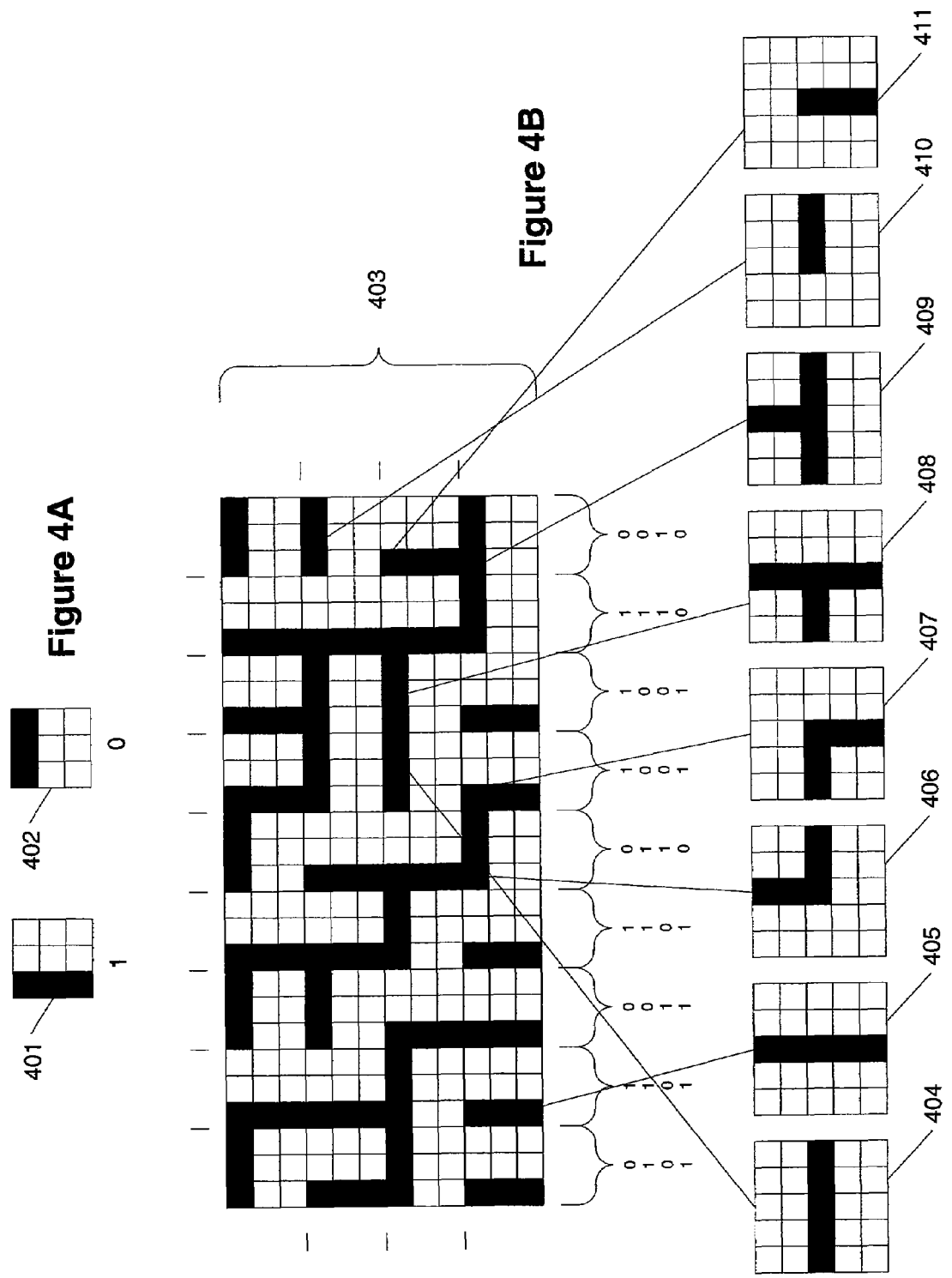

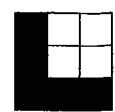
Figure 5A
Figure 5B
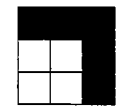
Figure 5C
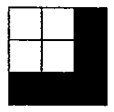
Figure 5D
Figure 4C
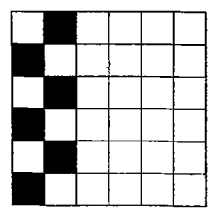
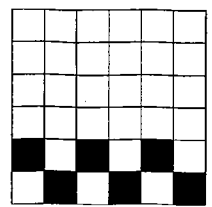
Figure 4D
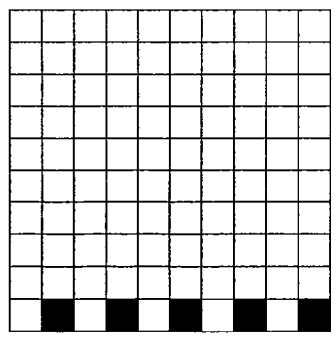 0
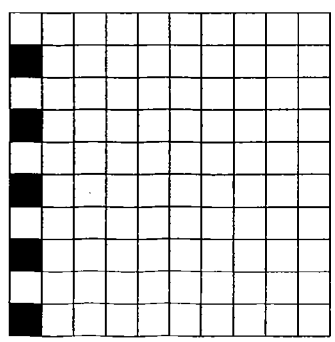 1
Figure 4E
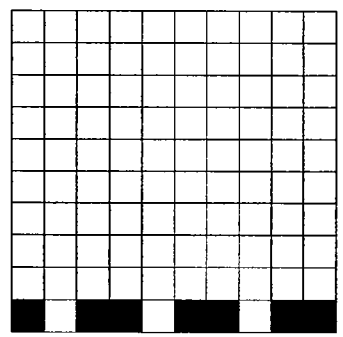 0
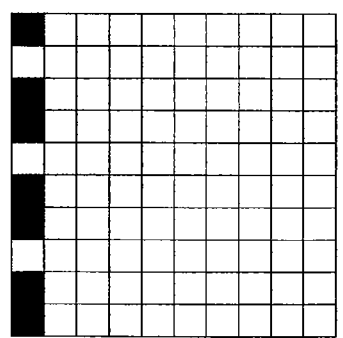 1

$$o = \theta + \begin{cases} 0 - no\ a \\ \dfrac{\pi}{2} - no\ b \\ \pi - no\ c \\ \dfrac{3\pi}{2} - no\ d \end{cases}$$

DECODING AND ERROR CORRECTION IN 2-D ARRAYS

CROSS REFERENCE TO RELATED APPLICATIONS

This is a divisional of application Ser. No. 10/284,422, filed Oct. 31, 2002 now U.S. Pat. No. 7,116,840.

TECHNICAL FIELD

The present invention relates to interacting with a medium using a digital pen. More particularly, the present invention relates to determining the location of a digital pen during interaction with one or more surfaces.

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

One technique of capturing handwritten information is by using a pen whose location may be determined during writing. One pen that provides this capability is the Anoto pen by Anoto Inc. This pen functions by using a camera to capture an image of paper encoded with a predefined pattern. An example of the image pattern is shown in FIG. 11. This pattern is used by the Anoto pen (by Anoto Inc.) to determine a location of a pen on a piece of paper. However, it is unclear how efficient the determination of the location is with the system used by the Anoto pen. To provide efficient determination of the location of the captured image, a system is needed that provides efficient decoding of the captured image.

SUMMARY

Aspects of the present invention provide solutions to at least one of the issues mentioned above, thereby enabling one to locate a position or positions on a viewed image. The viewed image may be on a printed image or may be a graphical representation on a displayed computer image. Aspects of the present invention include a decoding process that permits efficient decoding of a captured image, providing for efficient determination of the location of the image. These and other aspects of the present invention will become known through the following drawings and associated description.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 2A and 2B show an image capture system and corresponding captured image in accordance with embodiments of the present invention.

FIGS. 3A through 3F show various sequences and folding techniques in accordance with embodiments of the present invention.

FIGS. 4A through 4E show various encoding systems in accordance with embodiments of the present invention.

FIGS. 5A through 5D show four possible resultant corners associated with the encoding system according to FIGS. 4A and 4B.

DETAILED DESCRIPTION

Aspects of the present invention relate to determining the location of a captured image in relation to a larger image. The location determination method and system described herein may be used in combination with a multi-function pen.

The following is separated by subheadings for the benefit of the reader. The subheadings include: terms, general-purpose computer, image capturing pen, encoding of array, decoding, error correction, and location determination.

Terms

Pen—any writing implement that may or may not include the ability to store ink. In some examples, a stylus with no ink capability may be used as a pen in accordance with embodiments of the present invention.

Camera—an image capture system that may capture an image from paper or any other medium.

General Purpose Computer

Figure 1:
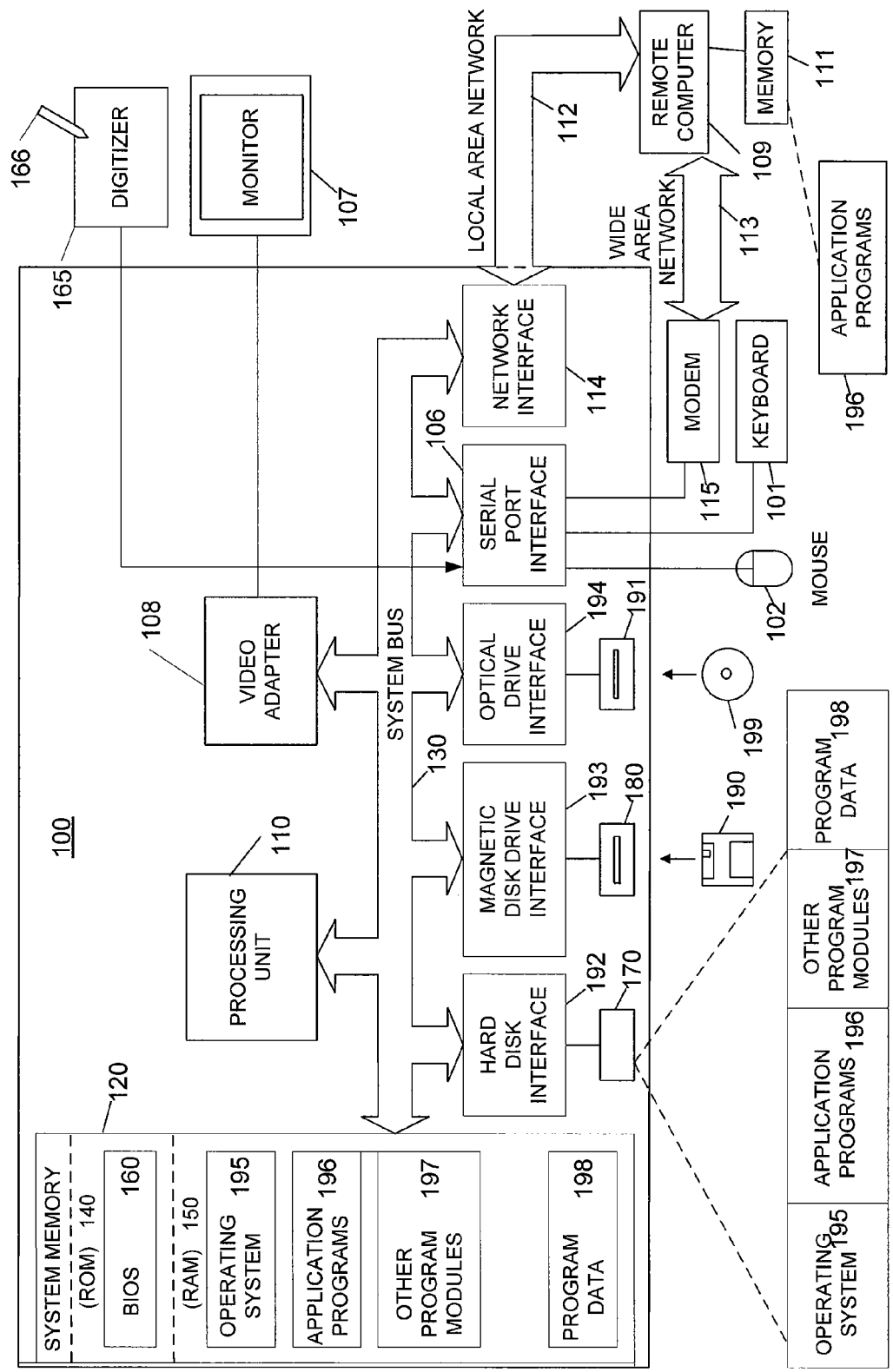
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 199 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form. The displayed form may be printed paper (or other physical medium) or may be a display projecting the encoded data stream in conjunction with another image or set of images. For example, the encoded data stream may be represented as a physical graphical image on the paper or a graphical image overlying the displayed image or may be a physical (non-modifiable) graphical image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing the location of the camera, the system can track movement of the stylus being controlled by the user. The displayed or printed image may be a watermark associated with the blank or content-rich paper or may be a watermark associated with a displayed image or a fixed coding overlying a screen or built into a screen.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 is 32×32 pixels (where N=32). Accordingly, FIG. 2B shows a field of view of 32 pixels long by 32 pixels wide. The size of N is adjustable based on the degree of image resolution desired. Also, while the field of view of the camera 203 is shown as a square for illustrative purposes here, the field of view may include other shapes as is known in the art.

The input to the pen 201 from the camera 203 may be defined as a sequence of image frames $\{I_i\}$, $i=1, 2, \ldots, A$, where $I_i$ is captured by the pen 201 at sampling time $t_i$. The sampling rate may be fixed or may be variable based on the size of the document. The size of the captured image frame may be large or small, depending on the size of the document and the degree of exactness required. Also, the camera image size may be determined based on the size of the document to be searched.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211. Because the transformation from the location of the virtual pen tip 212 (represented by $L_{virtual\text{-}pentip}$) to the location of the real pen tip 202 (represented by $L_{pentip}$), one can determine the location of the real pen tip in relation to a captured image 210.

The following transformation $F_{S \to P}$ transforms the image captured by camera to the real image on the paper:

$$L_{paper} = F_{S \to P}(L_{Sensor})$$

During writing, the pen tip and the paper are on the same plane. Accordingly, the transformation from the virtual pen tip to the real pen tip is also $F_{S \to P}$:

$$L_{pentip} = F_{S \to P}(L_{virtual\text{-}pentip})$$

The transformation $F_{S \to P}$ may be referred to as a perspective transformation. This simplifies as:

$$F'_{S \to P} = \begin{Bmatrix} s_x \cos\theta, & s_y \sin\theta, & 0 \\ -s_x \sin\theta, & s_y \cos\theta, & 0 \\ 0, & 0, & 1 \end{Bmatrix}$$

as the estimation of $F_{S \to P}$, in which $\theta$, $s_x$, and $s_y$ are the rotation and scale of two orientations of the pattern captured at location 204. Further, one can refine $F'_{S \to P}$ to $F_{S \to P}$ by matching the captured image with the corresponding background image on paper. "Refine" means to get a more precise perspective matrix $F_{S \to P}$ (8 parameters) by a kind of optimization algorithm referred to as a recursive method. The recursive method treats the matrix $F'_{S \to P}$ as the initial value. $F_{S \to P}$ describes the transformation between S and P more precisely than $F'_{S \to P}$.

Next, one can determine the location of virtual pen tip by calibration.

One places the pen tip 202 on a known location $L_{pentip}$ on paper. Next, one tilts the pen, allowing the camera 203 to capture a series of images with different pen poses. For each image captured, one may receive the transform $F_{S \to P}$. From this transform, one can obtain the location of the virtual image of pen tip $L_{virtual\text{-}pentip}$:

$$L_{virtual\text{-}pentip} = F_{P \to S}(L_{pentip})$$

And, $$F_{P \to S} = 1/F_{S \to P}$$

By averaging the $L_{virtual\text{-}pentip}$ received from every image, an accurate location of the virtual pen tip $L_{virtual\text{-}pentip}$ may be determined.

The location of the virtual pen tip $L_{virtual\text{-}pentip}$ is now known. One can also obtain the transformation $F_{S \to P}$ from image captured. Finally, one can use this information to determine the location of the real pen tip $L_{pentip}$:

$$L_{pentip} = F_{S \to P}(L_{virtual\text{-}pentip})$$

Encoding of Array

A two-dimensional array may be constructed by folding a one-dimensional sequence. Any portion of the two-dimensional array may be used to determine its location in complete two-dimensional array. One concern is that the image portion captured by a camera is limited in size. Accordingly, one needs to be able to determine the location from the captured image or a few captured images. Additional complications arise in that errors present in the captured image may compromise the availability of some points in the captured image. So as to minimize the possibility of a captured image portion being associated with two or more locations in the two-dimensional array, a non-repeating sequence may be used to create the array. One property of a created sequence is that the sequence does not repeat over a length (or window) n. The following describes the creation of the one-dimensional sequence then the folding of the sequence into an array.

Sequence Construction

A sequence of numbers may be used as the starting point of the encoding system. For example, a sequence (also referred to as an m-sequence) may be represented as a q-element set in field $F_q$. Here, $q = p^n$ where $n \geq 1$ and where p is a prime number. The sequence or m-sequence may be generated by a variety of different techniques including, but not limited to, polynomial division. Using polynomial division, the sequence may be defined as follows:

$$\frac{R_l(x)}{P_n(x)} \qquad (1)$$

where $P_n(x)$ is a primitive polynomial of degree n in field $F_q[x]$ (having q elements). $R_l(x)$ is a nonzero polynomial of degree l (where $l < n$) in field $F_q[x]$. The sequence may be created used an iterative procedure using two steps: first, dividing the two polynomials (resulting in an element of field Fq) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_I(x)$: changing $R_I(x)$ only cyclically shifts the sequence and every cyclical shifting corresponds to a polynomial $R_I(x)$. One of the properties of the resulting sequence is that, over a width (or length) n, any portion exists once in the sequence.

The process described above is but one of a variety of processes that may be used to create a non-repeating sequence.

Array Construction

The array (or m-array) that may be used to create the image (of which a portion may be captured by the camera) is an extension of the one-dimensional sequence or m-sequence. Let A be an array of period ($m_1$, $m_2$), namely $A(k+m_1, l)=A(k,l+m_2)=A(k,l)$. When an $n_1 \times n_2$ window shifts through a period of A, all the nonzero $n_1 \times n_2$ matrices over $F_q$ appear once and only once. This property may be referred to as a "window property" in that each window is unique. A may then be expressed as an array of period (m1, m2) (with $m_1$ and $m_2$ being the horizontal and vertical number of bits present in the array) and order (n1, n2).

A binary array (or m-array) may be constructed by folding the sequence. One approach is to obtain a sequence then fold it to a size $m_1 \times m_2$ where the length of the array is $L=m_1 \times m_2=2^n-1$. Alternatively, one may start with a predetermined size of the space one wants to cover (for example, one sheet of paper, 30 sheets of paper or the size of a computer monitor), determine the area ($m_1 \times m_2$), then use the size to let and $L \geq m_1 m_2$, where $L=2^n-1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths FIGS. 3E and 3F. The folding method as shown in FIG. 3D may be expressed as when $\gcd(m_1, m_2)=1$ where $L=2^n-1$.

To create the folding method as shown in FIG. 3D, one creates a sequence $\{a_i\}$ of length L and order n. Next, an array $\{b_{kl}\}$ of size $m_1 \times m_2$ is created from the sequence $\{a_i\}$ by letting each bit of the array be calculated as shown by equation 1:

$$b_{kl}=a_i \text{ where, } k=i \bmod(m_1), l=i \bmod(m_2), i=0, \ldots, L-1 \quad (1)$$

This folding approach may be alternatively expressed as laying the sequence on the diagonal of the array, then continuing from the opposite side when an edge is reached.

Figure 11:
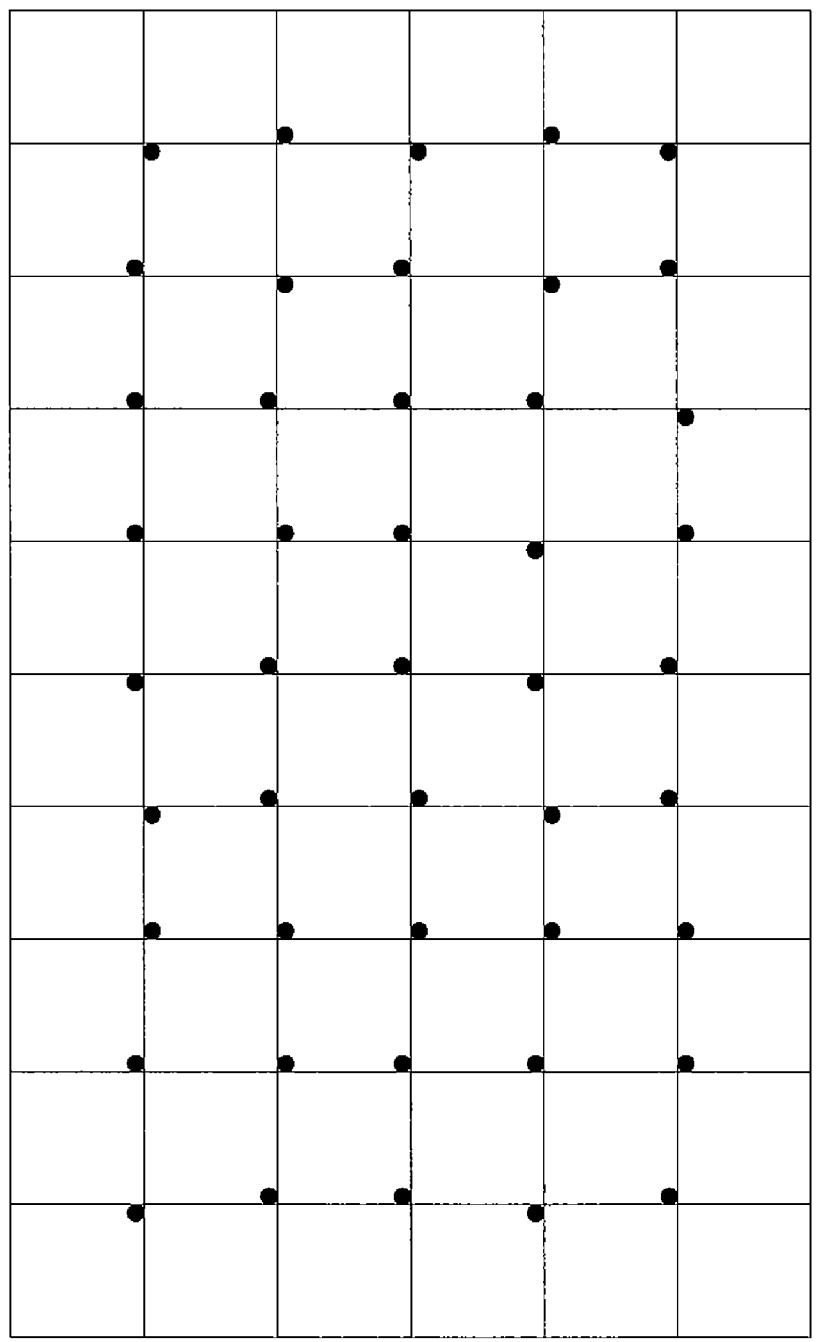
FIG. 11 shows a conventional representation of encoding space in a document.

FIG. 4A shows sample encoding techniques for a first bit and a second bit that may be used with the array of FIG. 3D. It is appreciated that other encoding techniques may be used. For example, an alternative coding technique is shown in FIG. 11.

Referring to FIG. 4A, a first bit 401 (for example, "1") is represented by a column of dark ink. A second bit 402 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 4A are represented by a 3×3 matrix of cells. The size of the matrix may be modified to be any size as based on the size and resolution of an image capture system. Alternative representation of bits 0 and 1 are shown in FIGS. 4C-4E. It is appreciated that the representation of a one or a zero for the sample encodings of FIGS. 4A-4E may be switched without effect. FIG. 4C shows bit representations occupying two rows or columns in an interleaved arrangement. FIG. 4D shows an alternative arrangement of the pixels in rows and columns in a dashed form. Finally FIG. 4E show pixel representations in columns and rows in an irregular spacing format (e.g., two dark blocks followed by a light block).

Referring back to FIG. 4A, if a bit is represented by a 3 by 3 matrix and an imaging system detects a dark row and two white rows in the 3×3 region, then a zero is represented (or a one). If an image is detected with dark column and two white columns, then a one is represented (or a zero).

Here, more than one block or pixel or dot is used to represent a bit. Using a single pixel (or block or bit) to represent a bit is fragile. Dust, creases in paper, non-planar surfaces, and the like create difficulties in reading single bit representations of data units. However, it is appreciated that different approaches may be used to graphically represent the array on a surface. Some approaches are shown in FIGS. 4C through 4E. It is appreciated that other approaches may be used as well. One approach is set forth in FIG. 10 using only space-shifted dots.

A bit stream is used to create the graphical pattern 403 of FIG. 4B. Graphical pattern 403 includes 12 rows and 18 columns. The rows and columns are formed by a bit stream being converted into a graphical representation using bit representations 401 and 402. FIG. 4B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 1 & 1 & 1 & 0 & 1 & 1 & 0 & 0 \end{bmatrix}$$

Decoding

When a person writes with the pen of FIG. 2A or moves the pen close to the encoded pattern, the camera captures an image. The image is then processed to determine the orientation of the captured image with respect to the complete representation of the encoded image and extract the bits that make up the encoded image.

FIG. 4B includes representations of the pixel blocks from image 403. The displayed images 404-411 show 5×5 pixel blocks. Pixel block 404 shows a dark row between white rows. Pixel block 405 shows a dark column between white columns. Pixel block 406 shows a bottom left corner. Pixel block 407 shows a top right corner. The pixel block 408 shows a dark column with half a dark row on the left. Pixel block 409 shows a dark row with half a dark column above the row. The pixel block 410 shows half a dark row. Pixel block 411 shows half a dark column. Analyzing the combination of pixel blocks, one appreciates that all combinations of pixel may be formed by the image segments found in pixel blocks 404-411.

Further, one may attempt to represent all possible pixel combinations with a smaller set of pixel blocks. Without more, one would expect that each of the four blocks shown in FIGS. 5A-5D to be found in the image 403. However, only three types of corners exist in the eight pixel blocks 404-411. In this example, there is no pixel block represented as FIG. 5A. By the fact that the image segments 401 and 402 may be chosen to eliminate a type of corner, this presents the opportunity to determine the orientation of a captured image based on the missing type of corner.

Figures 6, 7:
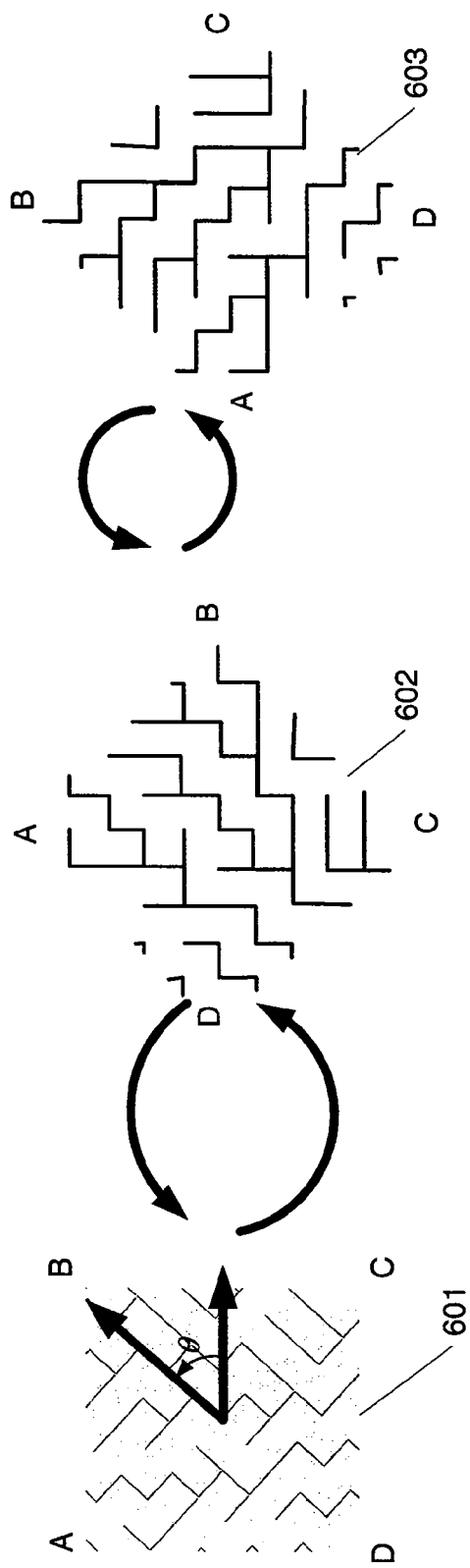
FIG. 6 shows rotation of a captured image portion in accordance with embodiments of the present invention.
FIG. 7 shows various angles of rotation used in conjunction with the coding system of FIGS. 4A through 4E.

Continuing to FIG. 6, the image a captured by a camera 601 may be analyzed and its orientation determined so as to be interpretable as to the position actually represented by the image 601. First, image 601 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 601 is analyzed to determine which corner is missing. The rotation amount o needed to rotate image 601 to an image ready for decoding 603 is shown as o=(θ plus a rotation amount {defined by which corner missing}). The rotation amount is shown by the equation in FIG. 7. Referring back to FIG. 6, angle θ is first determined by the layout of the pixels to arrive at a horizontal and vertical (or other predefined grid orientation) arrangement of the pixels and the image is rotated as shown in 602. An analysis is then conducted to determine the missing corner and the image 602 rotated to present the image as 603 to set up the image for decoding. Here, the image is rotated 90 degrees counterclockwise so location of image 603 may be recovered.

It is appreciated that the rotation angle θ may be applied before or after rotation of the image 601 to account for the missing corner.

Finally, the code in image 603 is read out and correlated with the original bit stream used to create image 403. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a hamming distance between the two bit streams. It is appreciated that a variety of approaches may be used to determine the location of the recovered bit stream within the original bit stream.

Once one has the recovered bits, one needs to locate the captured image within the original array (for example, the one shown in FIG. 4B). The process of determining the location of a segment of bits within the entire array is complicated by a number of items. First, the actual bits to be captured may be obscured from ideal capture by the camera (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

First, looking only at the sequence, let the sequence (or m-sequence) I correspond to the power series $I(x)=1/P_n(x)$. Also, $R(x)=r_0+r_1x+r_2x^2+\ldots+r_{n-1}x^{n-1}$ is any nonzero polynomial whose degree is less than n. Sequence R corresponds to $R(x)/P_n(x)$. As mentioned above, R is a shifted version of I. A distance D is defined as the distance between I and R. This may be represented as $D(R)=s$ if R is the s-th shift of I. This distance D may be computed using a number of different techniques. One technique is by determining the Hamming distance between the two. Another method is by using the Pohlig-Hellman-Silver algorithm as noted by Douglas W. Clark and Lih-Jyh Weng, "Maximal and Near-Maximal Shift Register Sequences: Efficient Event Counters and Easy Discrete Logorithms," IEEE Transactions on Computers 43.5 (May 1994, pp 560-568). Other distance determining techniques as known in the art may also be used. Using the Pohlig-Hellman-Silver algorithm, $R(x) \equiv x^s \bmod (P_n(x))$.

However, attempting to compute a distance using the folded sequence is more complex as the codes extracted may be non-consecutive and may further include errors. Starting with the above sequence analysis, one may determine a location from an image. One may start with the following relation:

$$R = r^t A \quad (2)$$

where, $r=(r_0\ r_1\ r_2\ \ldots\ r_{n-1})^t$, and $A=(I\ T(I)\ \ldots\ T^{n-1}(I))^t$ consists of the cyclic shifts of I. Accordingly, any cyclic shift of I is the product of $r^t$ and A. If the pen reads k bits ($b=(b_0\ b_1\ b_2\ \ldots\ b_{k-1})^t$ where ($k \geq n$) of I), R(x) may be used to cyclically shift $b_0$ to the beginning of the sequence (or m-sequence). This shifting then adjusts the columns of A to create an n×k sub-matrix M of A. Hence, $$r^T M = b^T. \quad (3)$$

where T represents a translation of the matrix or vector.

If all the rows of M are independent, r may be determined and D(R) resulting in the absolute position of $b_0$ in I by modulating the one-dimensional locations of equation (1). This means that the two-dimensional location of the $b_0$ bit may be determined. This position information permits the location of the pen tip to be determined.

Next, all modulations of A may be determined and checked.

Alternatively, because matrix A is large, not all modulations of A need to be retained. In fact, in some implementations, only relative positions between the columns are relevant. Thus, the columns that may be saved (after shifting $b_0$ to the beginning of the sequence (or m-sequence)) are those whose corresponding two-dimensional positions are within the reception field of the camera when the pen (and thus the camera) rotates. The columns may be stored in an array with two-dimensional position information (e.g., a matrix). An example includes:

"element-type CoreVector [rowsize][column-size]."

The total number of such columns is much smaller than L (where $L=2^n-1$). If b is error-free, the solution of r may be expressed as:

$$r^t = \tilde{b} \tilde{M}^{-1} \quad (4)$$

where $\tilde{M}$ is any non-degenerate n×n sub-matrix of M and $\tilde{b}$ is the corresponding sub-vector of b.

Error Correction

If errors exist in b, then the solution of r becomes more complex. If the number of errors in b (expressed as $n_e$) is less than d/2, where d is the least Hamming distance of the code generated by M, b can be corrected. Unfortunately, as the matrix M changes for different pen poses and that the structure of matrix M is not regular, traditional methods of decoding with error correction may not readily apply. In some instances, it has been suggested that it is not possible to accurately determine d when errors are present. See Ilya Dumer, Daniele Micciancio and Madhu Sudan, "Hardness of Approximating the Minimal Distance of a Linear Code", IEEE Symposium on Foundations of Computer Science. 1999, pp. 475-485.

However, positive results have been achieved using a stochastic approach. Assuming that $n_e$ is relatively small compared to k, the probability of choosing correct n bits from the k bits of b is large when randomly chosen n bits whose corresponding columns in M are independent.

The system may repeatedly select random bits in an image. If the system repeats this selection and analysis a number of times, it can generally isolate the proper distance in the sequence. In other words, when correct bits are chosen, the Hamming distance between $b^t$ and $r^tM$ will be minimal, where r is computed via equation (4). Repeated several times, the correct r will occur more times than other distances and thus can be easily identified. This result may be used alone or may be combined with previous location information. For example, if the camera captures a string of images that can be located in a line near the top of the page and the current image from the camera provides, for example, two distances from the previous string with one being very close and one being very far, it is more likely that the user only moved the pen a small amount rather than a large amount in a very short time. Other types of analyses between previous image captures and current image captures may be used.

If there are different r's such that the Hamming distance between $b^t$ and $r^tM$ are all minimal, then the probability that $n_e$ exceeds the error correcting ability of the code generated by M is large and the decoding process fails. The system then may move onto the next captured image from the camera.

Finally, the correct b may be determined and the localization of r in sequence (m-sequence) I can be computed by various techniques (including but not limited to the Pohlig-Hellman-Silver algorithm). The pen tip may then be located.

Figure 8:
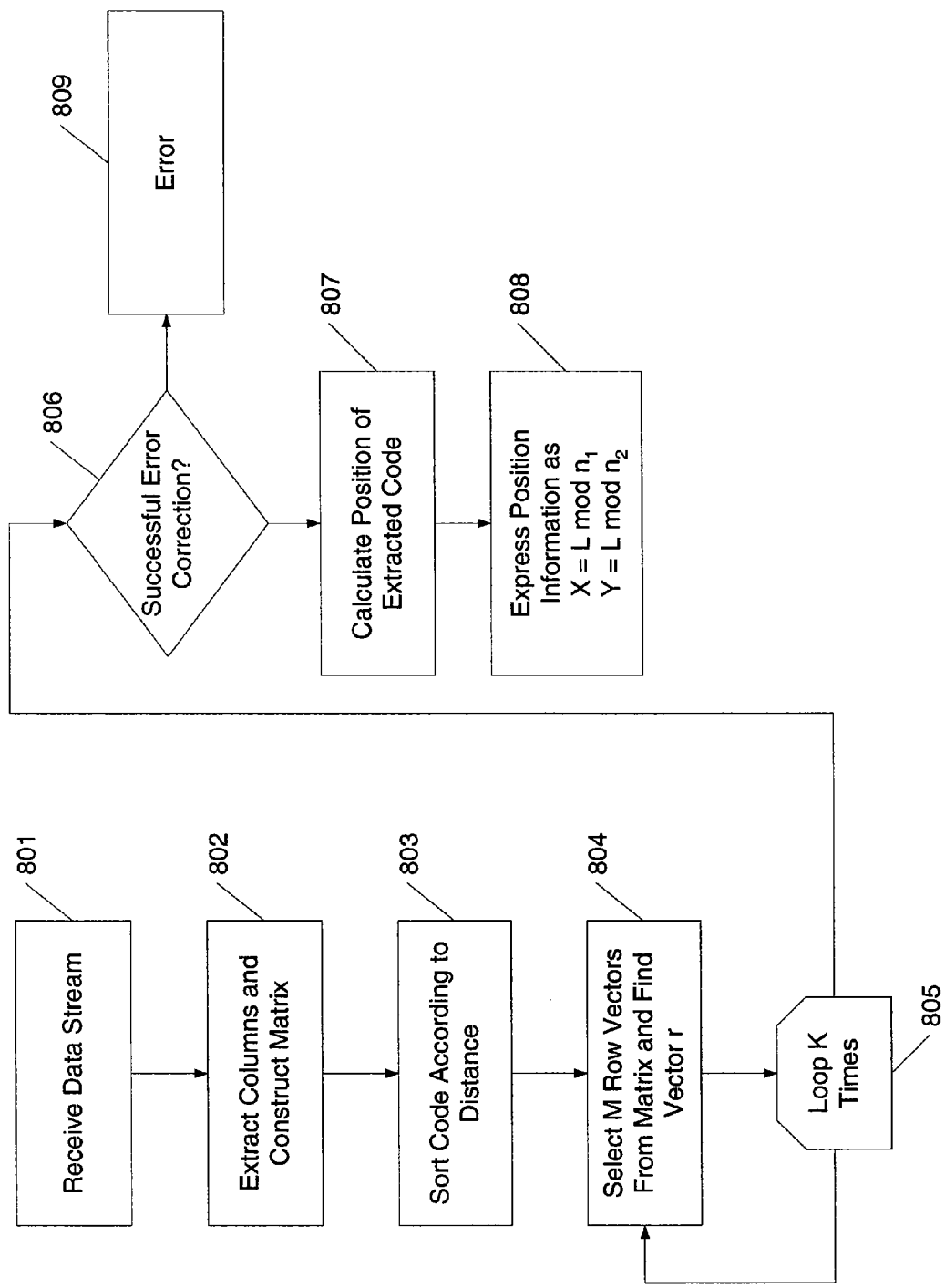
FIG. 8 shows a process for determining the location of a captured array in accordance with embodiments of the present invention.

FIG. 8 reflects a process that may be used to determine a location in a sequence (or m-sequence) of a captured image. First, in step 801, a data stream relating to a captured image is received. In step 802, columns are extracted from the captured image and a matrix constructed of the information in the captured image. In step 803, the code is sorted according to distance. The code may be sorted using a variety of sorting algorithms as are known in the art. For example, a selection sorting algorithm may be used. The selection sorting algorithm is beneficial where m is not large. However, if m becomes large, other sorting algorithms (for example, a merge sort) that handle larger number of items more efficiently may be used.

In step 804, M row vectors are selected from the matrix constructed in step 802 and distance vector r is determined from the matrix of 802 to the begging of the array (or m-array).

The captured image may include more information than needed to determine the location of the matrix M. For example, if each bit is represented by 9 pixels and the camera imaging system includes a 32×32 bit matrix, then approximately 100 bits may be obtained (10×10). Of these imaged bits, n are used to determine the location. So, for example, if the array $m_1, m_2$ size was 255×255 (65,025), then the number of bits needed to locate a captured image would be n where $m_1 \times m_2 \leq L=2^n-1$. Here, n=16. Accordingly, the number of bits the captured image would need to produce to be able to locate the image is n. In order to provide a variety of different selections to account for error, more than n bits need to be extracted from the image. For example, if the number of n needed is 16, the camera may be needed to produce 18 or more bits.

This analysis is performed K times (for example, 10 to 100 to 500 times) in step 805. The method attempts to determine the position that has the largest number of repeated results and whose number of error bits is less than a value (for example, 3). The system then determines in step 806 whether error correction was performed successfully. If no, then an error is returned in step 809. If yes, then the position of the extracted code is calculated in the sequence (or m-sequence) in step 807 (by, for example, the Pohig-Hellman-Silver algorithm). This step may also include the sub steps of calculating $y_i = y_n/m_1$, and looking up the factors in the group table to get the residual value of $R_i$. This may be expressed as:

$$L = \sum \left(\frac{n}{\text{mi}} \cdot Ri \cdot Vi\right) \bmod n \quad (5)$$

L represents the position in the sequence. Next, the (X, Y) position in the array is expressed as x=L mod $n_1$ and y=L mod $n_2$ and the results returned in step 808.

Location Determination

Figure 9:
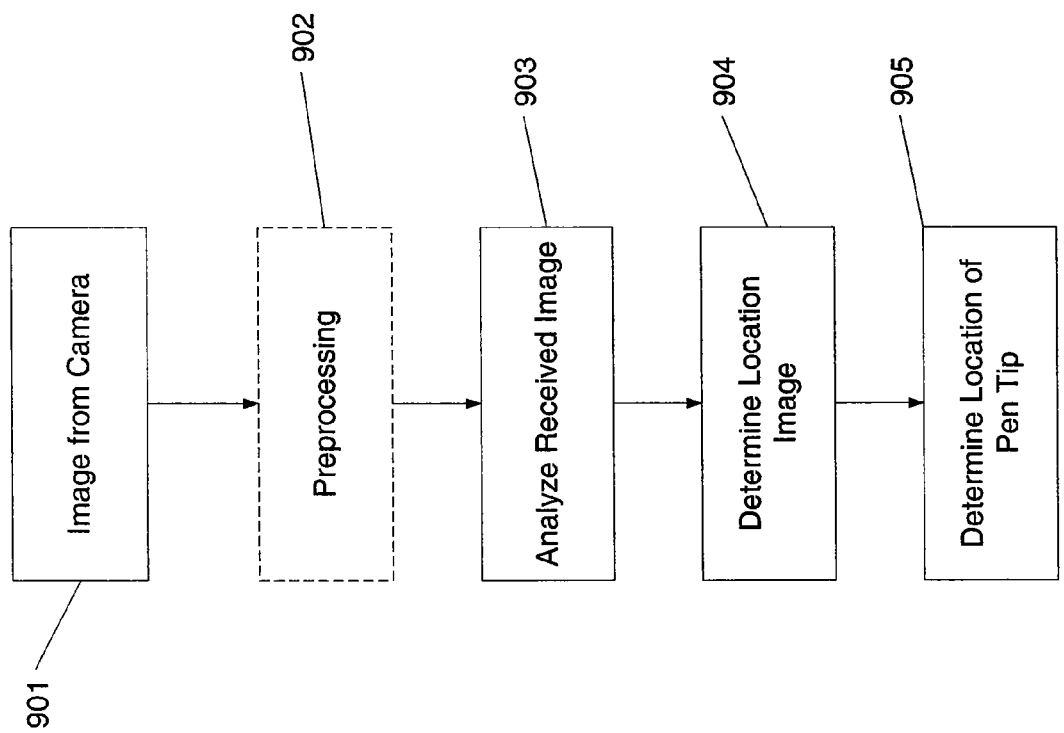
FIG. 9 shows a method for determining the location of a captured image in accordance with embodiments of the present invention.

FIG. 9 shows a process for determining the location of a pen tip. The input is an image captured by a camera and the output may be a position coordinate of the image compared with the total image. Also, the output may include (or not) a rotation angle of the captured image.

In step 901, an image is received from a camera. Next, the received image may be optionally preprocessed in step 902 (as shown by the broken outline of step 902) to adjust the contrast between the light and dark pixels, in an attempt to determine the rotation angle of the captured image, and the like.

Next, in step 903, the image is analyzed to determine the bit stream within it.

Next, in step 904, the bit stream is compared against the original bit stream and the location of the received bit stream within the original bit stream is determined. This comparison may be made when the system is aware of how the original bit stream is wrapped to create the image 403. Finally, once the location of the captured image has been determined in step 904, the location of the pen tip may be determined in step 905.

Figure 10:
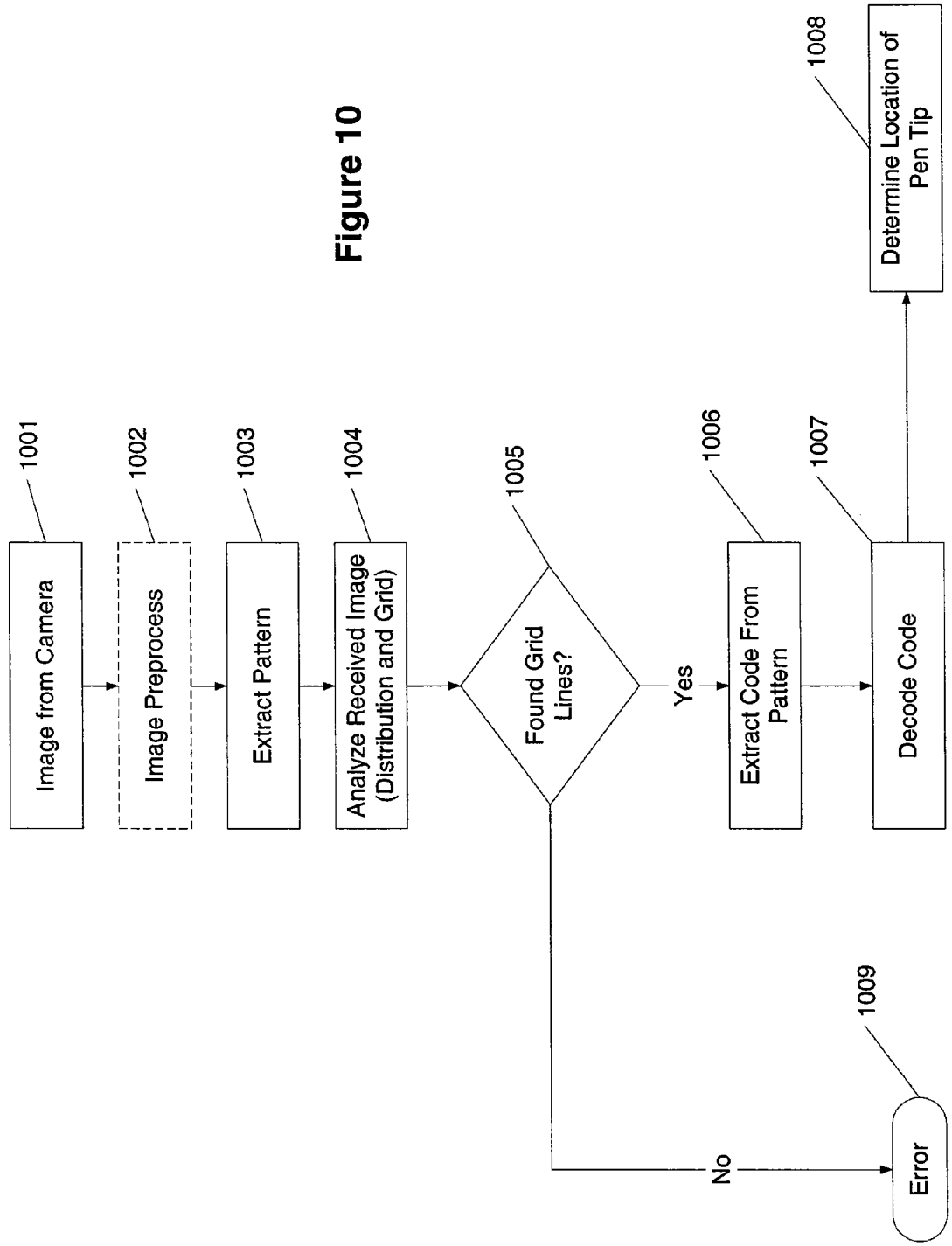
FIG. 10 shows another method for determining the location of captured image in accordance with embodiments of the present invention.

FIG. 10 shows an alternative approach to determining the location of the pen tip. First, an image is received from the camera in step 1001. The image then may optionally undergo image preprocessing in step 1002 (as shown by the broken outline of step 1002). The pattern is extracted in step 1003. Here, pixels on the various lines may be extracted to find the orientation of the pattern and determine the angle θ.

Next, the received image is analyzed in step 1004 to determine the underlying distribution of pixels and grid lines. If grid lines are found in step 1005, then the code is extracted from the pattern in step 1006. The code is then decoded in step 1007 and the location of the pen tip determined in step 1008. If no grid lines were found in step 1005, then an error is returned in step 1009.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. A process for determining a location in a sequence of a captured image comprising:
    capturing an image with a camera from an electronic pen;
    receiving a data stream corresponding to the captured image;
    extracting columns from said captured image;
    constructing a matrix from said columns;
    sorting extracted code from said columns by distance;
    determining a vector from said code to code in a larger array;
    determining a position of the extracted code; and
    determining a position of a tip of the electronic pen based upon the determined position of the extracted code.

2. The process according to claim 1, further comprising:
    constructing at least another matrix from said columns; and
    determining at least a second vector from said code.

3. The process according to claim 1, further comprising:
    performing error correction on said code.

4. The process according to claim 1, further comprising:
    outputting the determined position of the tip of the electronic pen to a display screen.

5. A computer-readable medium having program stored thereon for determining a location in a sequence of a captured image that, when executed by a computer causes the computer to:
    capture an image with a camera from an electronic pen;
    receive a data stream corresponding to the captured image;
    extract columns from said captured image;
    sort extracted code from said columns by distance;
    construct a matrix from said columns;
    determine a vector from said code to code in a larger array;
    determine a position of the extracted code; and
    determine a position of a tip of the electronic pen based upon the determined position of the extracted code.

6. The computer-readable medium according to claim 5, further causing the computer to:
    construct at least another matrix from said columns; and
    determine at least a second vector from said code.

7. The computer-readable medium according to claim 5, further causing the computer to:
    perform error correction on said code.

8. The computer-readable medium according to claim 5, further causing the computer to:
    output the determined position of the tip of the electronic pen to a display screen.

9. A system for determining a location of a captured image in a larger array to determine the position of a tip of an electronic pen with respect to a surface comprising:
    a storage configured to store information regarding said larger array;
    a camera in an electronic pen configured to capture an image:
    an input configured to receive said captured image;
    a processor configured to determine a distance between said captured image and said larger array by determining a shift of a sequential version of said captured image from said larger array and to determine a position of a tip of the electronic pen based upon the determined distance.

10. The system according to claim 9, the processor further configured to:
    output the determined position of the tip of the electronic pen to a display screen.

11. The system according to claim 9, wherein the determined distance between said captured image and said larger array is a Hamming distance.

* * * * *

UNITED STATES PATENT AND TRADEMARK OFFICE
CERTIFICATE OF CORRECTION

PATENT NO.         : 7,330,605 B2
APPLICATION NO.    : 11/470334
DATED              : February 12, 2008
INVENTOR(S)        : Jian Wang et al.

Page 1 of 1

It is certified that error appears in the above-identified patent and that said Letters Patent is hereby corrected as shown below:

In column 13, line 27-28, in Claim 1, delete "constructing a matrix from said columns; sorting extracted code from said columns by distance;" and insert -- sorting extracted code from said columns by distance; constructing a matrix from said columns; --, therefor.

In column 14, line 30, in Claim 9, delete "image:" and insert -- image; --, therefor.

Signed and Sealed this
Twenty-second Day of February, 2011

David J. Kappos
*Director of the United States Patent and Trademark Office*